Oct. 11, 1955 — E. GISONDI — 2,720,135
EXPANDING SCREW ANCHOR
Filed May 7, 1953
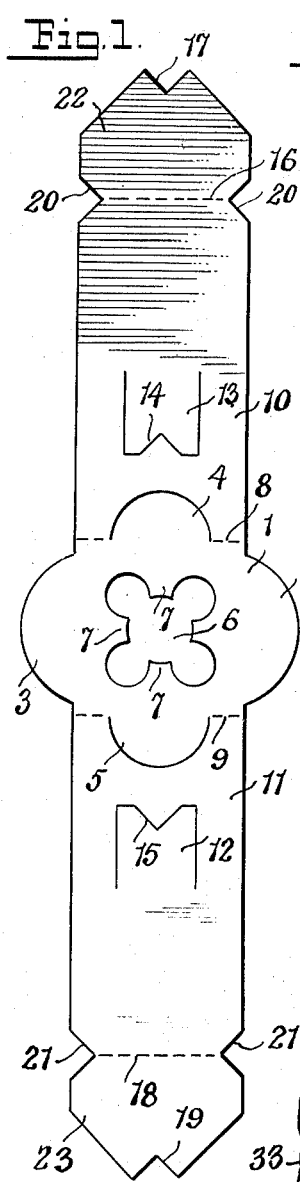
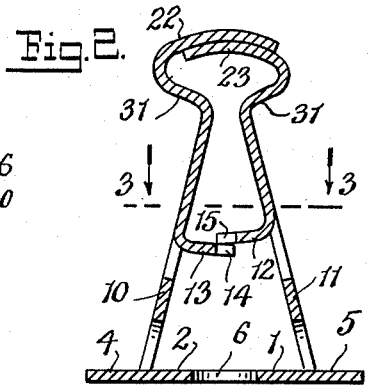
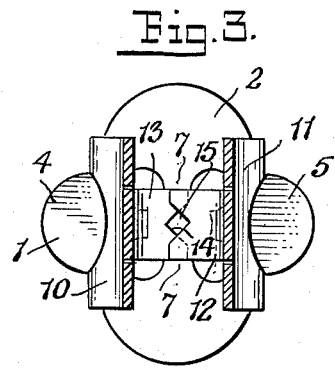
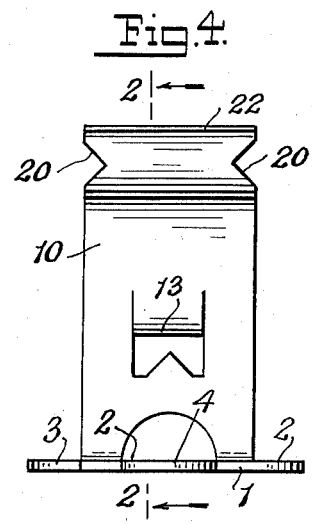
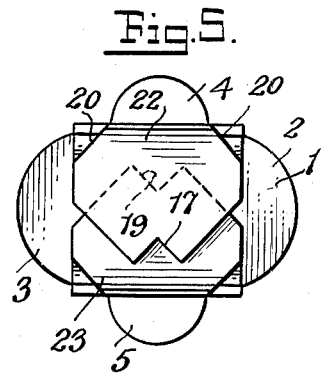
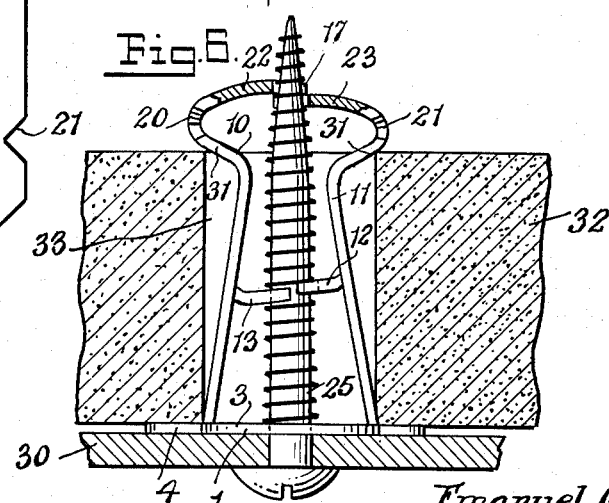
INVENTOR.
Emanuel Gisondi
BY
Harry Radzinsky
Attorney

United States Patent Office 2,720,135
Patented Oct. 11, 1955

2,720,135

EXPANDING SCREW ANCHOR

Emanuel Gisondi, New York, N. Y.

Application May 7, 1953, Serial No. 353,513

2 Claims. (Cl. 85—2.4)

This invention relates to anchorages for screws, or other threaded or roughened fasteners and particularly those intended for securing articles or fixtures to walls and other surfaces which normally do not, in and of themselves, afford a secure anchorage for a screw or the like.

The invention contemplates the provision of a fastener of the kind disclosed in my Patents Nos. 2,369,962, dated February 20, 1945, and No. 2,398,784, dated April 23, 1946, and constitutes an improvement in the devices therein disclosed. The present invention comprises an anchorage preferably made from sheet metal or the like, which is extended through an opening in the wall, ceiling or other surface, and is adapted to have prongs or legs of suitable shape engage behind the material of the wall or ceiling, or else be expanded within the hole formed therein in a manner to strongly anchor itself in place while securely engaging the thread or roughened surface of the screw or other fastening element inserted within it at a number of points along the length of the screw.

It is another object of the invention to provide an anchorage of this character which will accept wood screws, machine screws or other threaded or roughened elements; which will not be critical as to the size of the screw inserted into it; which is operated solely by the insertion of the screw, and which will securely hold the screw and thus enable the screw to firmly attach fixtures or other elements to the wall or other surface in which the anchorage is placed.

It is still another object of the invention to provide an anchorage of this character in which a pointed-end screw, such as a wood screw, will be centrally guided when inserted in place in the anchorage, and which will accurately and with certainty guide the screw in a manner to cause proper expansion of the parts of the device to insure the same being securely fastened in place.

These and other objects are accomplished by the invention, a more particular description of which will appear hereinafter and be set forth in the claims appended hereto.

In the accompanying drawing, wherein an illustrative embodiment of the invention is disclosed, Fig. 1 is a face view of a blank from which the improved anchorage is made;

Fig. 2 is a vertical sectional view through the anchorage, the same being taken substantially on the line 2—2 Fig. 4, looking in the direction of the arrows;

Fig. 3 is a sectional view, taken substantially on the line 3—3 of Fig. 2, looking in the direction of the arrows;

Fig. 4 is a side elevational view of the anchorage;

Fig. 5 is a top plan view of the anchorage, and

Fig. 6 is a front elevational view of the anchorage, with parts in section, showing the same in place and in engagement with a screw used for securing a fixture or other element to a wall.

The blank from which the anchorage shown in Figs. 2 to 6 inclusive is made, is shown in Fig. 1 wherein it will be noted that the same consists of an elongated strip of resilient spring metal, such as sheet steel or other suitable material. The blank is provided with a central enlargement 1, which forms the head of the anchorage, and through which a screw 25 or other threaded or rough-surfaced fastening member is extended to attach a fixture 30 to a wall or other surface. The head 1 is provided with lateral enlargements 2 and 3 to provide a substantial bearing surface, and with a central aperture or hole 6 through which the screw 25 passes. Bordering said aperture 6 is a plurality of springy tongues 7 which are adapted to engage with either the thread on the screw or else frictionally engage the threadless portion of the shank of the screw, when the screw is passed through the central aperture or hole 6.

Extending radially from the head 1, is a prong 10 constituting one of the legs of the anchorage, said leg being bent rearwardly on the fold line 8 to the position clearly disclosed in Figs. 2, 4 and 6. At its base, the prong or leg 10 is arcuately slitted to form a rounded tab extension 4 which forms a part of the head 1 and increases the area of the head. The second prong or leg of the anchorage is shown at 11 and the same is similar to the leg 10, the leg 11 being folded rearwardly on the line 9 and arcuately slitted to form the tab extension 5, which also forms a part of the head 1. The leg 10 is slitted to form a lug 13 which is formed in its free end with a notch 14. Similarly, the prong or leg 11 is slitted to produce the lug 12 formed in its free end with the notch 15. The two lugs 12 and 13 are bent inwardly or toward one another between the converging prongs or legs 10 and 11 and they lie with their notched ends 14 and 15 in slightly overlapped relationship, as clearly seen in Fig. 3. This arrangement is such as to provide a square or diamond-shaped opening between the notches 14 and 15 and located in line with the center of the opening 6 in the head 1 of the anchorage.

At its free end the prong 10 is provided with a part 22 which is curved or shaped into hook form as clearly seen in Figs. 2 and 6. In the end of the hook 22 is provided a notch 17, and to facilitate the formation of the part 22 into the desired hook shape, the opposite side edges of the blank are notched as shown at 20.

The free end of the leg or prong 11 is also formed into hook shape 23 as clearly seen in Figs. 2 and 6, and this hook-shaped end is notched as indicated at 19, and also notched as shown at 21, to facilitate the formation of this part into the desired hook shape. As will be seen in Fig. 2, the hook-shaped ends 22 and 23 of the legs or prongs 10 and 11 normally lie in overlapping relation to a considerable extent while a screw is not in place on the anchorage. Each of the hook-shaped parts 22 and 23 is so shaped as to provide a shoulder 31.

In placing the anchorage in position in a wall, ceiling or other location, a hole 33 or properly shaped aperture is made in the wall, which might be of plaster, or might be composed of one or more thicknesses of any known sheet material. For simplicity in illustration, a single thickness of material is shown at 32. The anchorage is inserted through the hole 33 until the head 1 comes into facial contact with the outer surface of the wall. The prongs or legs 10 and 11 are preferably of such length that they will have their hook portions 22 and 23 projecting rearwardly of the wall material 32 to thereby engage in back of the wall material when these legs are spread apart by the insertion of the screw 25. While it is desirable that the hooked portions 22 and 23 shall be positioned behind the wall material 32, it is nevertheless not absolutely necessary that this be the case since a wedging action can be secured within the hole 33 if necessary, rather than an engagement had behind the plaster or other material 32.

A wood-screw 25, machine screw or other suitable fastening element, and preferably one having a threaded surface and at least a tapered end, is now inserted through the central hole 6 in the head of the anchorage and when it has passed through said hole for a short distance, its pointed end or tip will necessarily be centered by entry into the opening defined by the notched ends 14 and 15 of the inturned lugs 12 and 13, which opening is plainly seen in Fig. 3. As the screw passes through this opening it will exert pressure on the lugs 12 and 13, tending to spread them apart and hence to separate the legs of prongs 10 and 11 to an extent necessary to move the overlying hooked ends 22 and 23 apart to enable the end of the screw to enter between the notches 17 and 19 in the ends 22 and 23. When the screw is fully inserted in the anchorage, or has been screwed home, as seen in Fig. 6, it will be observed that the screw is engaged by the anchorage at three points, namely, adjacent to the head of the screw by the tongues 7; at a substantially midway point by the notched ends of the lugs 12 and 13 and relatively close to the tip or extremity of the screw by the notched ends 17 and 18 of the hooked parts 22 and 23 of the legs or prongs 10 and 11. This engagement is such as to cause the screw to be firmly but resiliently gripped at several points along its length so that it is anchored securely and prevented from unthreading or shifting longitudinally and can be used for securing a fixture 30 or other element to the exposed face of the wall 32. The entry of the screw 25 into the anchorage, spreads the legs or prongs 10 and 11 apart to such an extent as to cause the shoulders 31 to engage at the back of the wall material 32 and thus maintain the anchorage very firmly in position. If the anchorage is not sufficiently long to enable the shoulders 31 to engage behind the material of the wall, the legs will be nevertheless securely wedged in the hole 33 to maintain the anchorage fixedly in place.

While I have herein shown a single embodiment of the invention, it is obvious that the same may be modified in many particulars to suit different requirements. In any case, the installation is very simple since the device is merely inserted in an aperture in the material in which it is to be held; the screw is inserted and automatically centered by engagement with the notches 14 and 15 and which guide the screw to enable it to enter into the opening defined by the notches 17 and 19. The screw may be withdrawn whenever desired, but will not loosen inadvertently since it is securely and resiliently engaged at three points along its length by the tongues 7, lugs 12 and 13 and the notches 17 and 19. Since the parts of the anchorage are resilient, several sizes of screws may be accommodated in the device, thus enabling it to be put to many uses with standard types of screws or like fasteners. Also, since the legs or prongs of the device will spring toward one another when the screw is removed, the anchorage can be removed from its hole at any time, without requiring enlargement of the hole for its removal, and the hole thereafter plugged when the removal or shifting of a fixture is required.

What I claim is:

1. A screw anchorage of the character described comprising, a sheet metal strip having a flat head provided with a central screw-receiving opening defined by a plurality of inwardly extending resilient tongues adapted to engage with the threads of a screw inserted through said opening, a pair of prongs formed integrally with the head and convergingly extending rearwardly from one face thereof, said prongs being adapted to be inserted through a wall opening, with the head overlapping the end of the opening, each of the prongs consisting of a flat strip member having a reversely curved hooked end defining a shoulder at the outer side of the prong, the hooked ends of the prongs being normally arranged in overlapping relationship and the end of each prong being notched to engage against the threads of the screw, each of the prongs having an inwardly directed lug intermediate its ends, the lugs being in opposed relationship between the prongs, the ends of the lugs being notched and defining a screw-receiving opening between them initially of a size less than the diameter of an associated screw and which opening is axially aligned with the screw-receiving opening in the head, a fastening screw adapted to be extended through the screw-receiving opening and between the lugs and also between the ends of the prongs, said screw being guided in its threading movements by the fingers extending into the screw-receiving opening in the head for its entry between the lugs and causing the prongs to separate and space the hooked ends of the prongs to an extent to permit the entry of the end of the screw between said notched ends.

2. A screw anchorage of the character described comprising, a sheet metal strip having a flat head provided with a central screw-receiving opening defined by at least four inwardly extending resilient tongues adapted to engage with the threads of a screw inserted through said opening, a pair of prongs formed integral with the head and convergingly extending from one face thereof, said prongs being adapted to be inserted rearwardly through a wall opening, each of the prongs consisting of a flat strip member having a reversely curved hooked free end defining a shoulder at the outer side of the prong, the hooked ends of the prongs being normally arranged in overlapping relationship and the end of each prong being notched to engage against the threads of the screw, each of the prongs having an inwardly directed lug intermediate its ends, the lugs being normally in overlapped relationship between the prongs, the ends of the lugs being notched so that while the lugs are in their overlapped relationship they define a substantially rectangular opening between them initially of a size less than the diameter of an associated screw and which opening is axially aligned with the screw-receiving opening in the head, a fastening screw extending through a screw-receiving opening and between the lugs and also between the prongs, said screw being guided in its threading movements by the fingers extending into the screw-receiving opening in the head for its entry between the lugs and thereby expanding the lugs and causing the prongs to separate and space the hooked ends of the prongs to an extent to permit the entry of the end of the screw between said notched ends, the threads on the shank of the screw being engaged at three points by the tongues, the lugs and the hooked ends of the prongs respectively.

References Cited in the file of this patent

UNITED STATES PATENTS

| 2,208,779 | Tinnerman | July 23, 1940 |
| 2,244,975 | Tinnerman | June 10, 1941 |
| 2,337,267 | Owen | Dec. 21, 1943 |
| 2,369,962 | Gisondi | Feb. 20, 1945 |
| 2,386,732 | Wohlhieter | Oct. 9, 1945 |

FOREIGN PATENTS

| 535,367 | Great Britain | Apr. 7, 1941 |